United States Patent Office 3,243,425
Patented Mar. 29, 1966

3,243,425
NOVEL SULFUR-CONTAINING COMPOUNDS
Roy L. Whistler, West Lafayette, Ind., assignor to Purdue Research Foundation, Lafayette, Ind., a corporation of Indiana
No Drawing. Filed Oct. 29, 1962, Ser. No. 233,894
21 Claims. (Cl. 260—210)

This invention is concerned with a new series of sulfur-containing compounds and methods for their preparation.

The new sulfur compounds of the present invention are based upon the replacement of an oxygen atom in a sugar molecule by a sulfur atom. More specifically, the novel compounds are based upon the replacement of the ring oxygen of the sugar by the sulfur atom and oxidized forms of the sulfur atom. Thus, the novel compounds may be described generally as thiasugars.

The thiasugars within the scope of the present invention corresponds to the following general formula

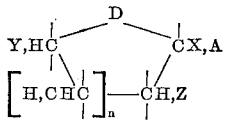

wherein $n$ is an integer having a value of 1 or 2; D is a member selected from the group consisting of thia (—S—), sulfoxide

and sulfone

consent is of record.
A is a member selected from the group consisting of —OH, —OR, —SR, —NHR and —NR$_2$, wherein R is a member selected from the group consisting of alkyl, aralkyl and aryl; X is a member selected from the group consisting of hydrogen and hydroxymethyl (—CH$_2$OH); Z is a member selected from the group consisting of hydrogen and hydroxyl; and Y is a member selected from the group consisting of hydrogen and hydroxymethyl (—CH$_2$OH) when $n$ is equal to 2 and Y is hydroxymethyl (—CH$_2$OH) when $n$ is equal to 1.

In the above general formula the actual configuration of the H, OH, A, X, Y, and Z groups about the ring carbon atoms has not been specified. Thus, in each case, it is to be understood that the configurations are variable and dependent upon the configuration of the starting materials and the synthetic methods used.

In essence the novel sulfur containing compounds of the present invention are based upon the replacement of the cyclic oxygen atom of the pyranose and furanose form of a sugar molecule with a sulfur atom, to yield the corresponding thiapyranose and thiafuranose compounds. The other series of novel compounds, the sulfur oxidation products are derived from the oxidation of the cyclic sulfur atom and, depending upon the extent of oxidation, may be either in the sulfoxide or sulfone form.

The thiopyranoses within the scope of the present invention correspond to the following general formula:

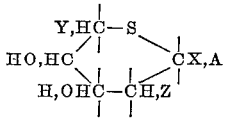

wherein A, X, Y, and Z have the meanings given above.

The thiafuranoses within the scope of the present invention correspond to the following general formula:

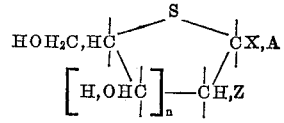

wherein A, X and Z have the meanings given above.

The thiapyranose and thiafuranose compounds of the present invention may be prepared by three general methods. In the case of the thiapyranoses the useful starting material is the furanose form of the sugar to be converted. For the thiafuranose compounds the starting materials are the open chain form of the sugar to be converted. The other series of compounds, the sulfur oxidation products, are conveniently prepared from their corresponding thiapyranose and thiafuranose forms.

Naturally occurring sulfur-containing sugars exist only where an exocyclic oxygen has been replaced. Numerous sulfur derivatives have been prepared wherein a chain oxygen atom has been replaced by a sulfur atom. These known sulfur derivatives have been reviewed by Raymond, Advances in Carbohydrate Chemistry 1, 129 (1945). However, compounds in which the ring oxygen of the pyranose or the furanose form has been replaced by a sulfur atom are heretofore unknown.

The compounds are of both chemical and biochemical interest as sugar analogs. This is discussed more fully below.

The furanoses useful as starting materials for two of the processes of the present invention for the preparation of thiapyranoses correspond to the following general formula:

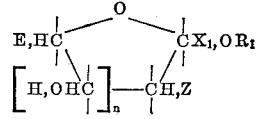

wherein R$_1$, Z$_1$, X$_1$ and E have the following significance; R$_1$ is a member selected from the group consisting of hydrogen, alkyl and aryl, X$_1$ is a member selected from the group consisting of hydrogen and hydroxymethyl (—CH$_2$OH), Z$_1$ is a member selected from the group consisting of hydrogen and hydroxyl, and E is a member selected from the group consisting of hydroxymethyl (—CH$_2$OH), and α,β-dihydroxyethyl

The choice of preparative methods to be used depends principally upon the grouping present on carbon atom 4 of the furanose ring, or with reference to the above general formula, the value of E. Thus, when E is a hydroxymethyl group (—CH$_2$OH) one synthetic method is used, while when E is an α,β-dihydroxyethyl group another synthetic method is used.

When E is a hydroxymethyl group the preparative method comprises the formation of a sulfonic acid ester, such as the p-toluenesulfonic acid ester, of the primary hydroxyl group of the hydroxymethyl group to yield a 5-O-sulfonyl furanose, the other reactive hydroxyl groups having been blocked by the formation of a cyclic acetal, such as an isopropylidine acetal of these groups and/or by ether formation, such as a furanoside. The 5-O-sulfonyl furanose is then desulfonyloxylated, by nucleophilic displacement by a sulfur nucleophile, wherein the negative charge resides on the sulfur, such as the nucleophile derived from the sodium salt of benzyl mercaptan, to give the corresponding 5-deoxy-5-thio compound. This 5-thio compound is then reduced with a suitable reducing agent, such as sodium in liquid ammonia, to the corresponding 5-deoxy-5-mercapto compound. Acid hydrolysis or alcoholysis of the 5-deoxy-5-mercapto compound yields the desired thiapyranose or thiapyranoside.

When E is an α,β-dihydroxyethyl group, the preparative method comprises the opening of the 5,6-episulfide ring with an acetolysis mixture comprising acetic anhydride, acetic acid, an excess acetate ion to form the corresponding 5-deoxy-5-thioacetyl compound. As in the above preparative method reactive hydroxyl groups may be blocked by means of the formation of cyclic acetals, such as isopropylidene acetal. The 5-deoxy-5-thioacetyl compound upon acid hydrolysis or alcoholysis yields the desired thiapyranose or thiapyranoside.

The open chain sugars, useful as starting materials in the process of the present invention for the preparation of the thiafuranoses, correspond to the following general formula:

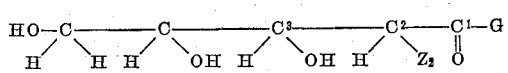

wherein G is a member selected from the group consisting of hydrogen and hydroxymethyl (—$CH_2OH$), and $Z_2$ is a member selected from the group consisting of hydrogen and hydroxyl.

The preparative method for the thiafuranoses is based upon the formation of the 4,5-dideoxy-4,5-episulfide of the above open chain sugars, the 4,5-episulfide ring is then cleaved for example with an acetolysis mixture comprising acetic anhydride, acetic acid and excess acetate ion to give the 4-deoxy-4-thioacetyl compound. This 4-deoxy-4-thioacetyl compound upon acid rearrangement and hydrolysis or alcoholysis yields the desired thiafurnanose or thiafuranoside.

The sulfur oxidation compounds within the scope of the present invention are prepared from the corresponding thiafuranose or thiapyranose compounds. Treatment of the thiafuranoses or thiapyranoses with a mild oxidizing agent, such as bromine water or hydrogen peroxide, will effect oxidation of the cyclic sulfur to the sulfoxide form. Continued treatment with the mild oxidizing agent will further oxidize the cyclic sulfur to the sulfone form.

A better understanding of the processes of this invention may be obtained from the examples given below, which disclose the best mode presently contemplated of carrying out this invention.

EXAMPLE I.—PREPARATION OF D-XYLOTHIAPYRANOSE AND METHYL α - D - XYLOTHIAFURANOSE FROM D-XYLOFURANOSE

Step 1.—1,2-O-isopropylidine-5-deoxy-5-thiobenzyl-α-D-xylofuranose

A solution of 12 g. of 1,2-O-isopropylidine-5-O-tosyl-α-D-xylofuranose, which was prepared by the method of Levene and Raymond, J. Biol. Chem. 102, 317 (1933), and 10 g. of the sodium salt of benzyl mercaptan in 400 ml. of ethanol was refluxed for 3 hours. After approximately 0.5 hr. sodium tosylate began depositing. An 80% yield of this material had deposited by the end of the reaction period. All of the reaction mixture was concentrated to dryness under vacuum and the solid residue was extracted with 200 ml. of chloroform and water. The chloroform extract was washed with 1 N sulfuric acid and then with water. After drying with sodium sulfate, the chloroform solution was concentrated to a sirup which crystallized upon the addition of ether and petroleum ether. Seven grams (71% yield) of crude white crystalline material was obtained, M.P. 90°. Two recrystallizations from ethanol gave pure 1,2-O-isopropylidene-5-deoxy-5-thiobenzyl-α-D-xylofuranose, M.P. 103° C., $[\alpha]_D^{25}$ —64.2° (c., 1.24 in methanol).

Analysis.—Calc'd for $C_{15}H_{20}O_4S$: C, 60.81; H, 6.76; S, 10.81. Found: C, 60.78; H, 6.74; S, 11.03.

Step 2.—1,2-O-isopropylidene-5-deoxy-5-mercapto-α-D-xylofuranose

Small pieces of sodium were added to a solution of 5.0 g. of 1,2-O-isopropylidene-5-deoxy-5-thiobenzyl-α-D-xylofuranose in liquid ammonia until the blue color which developed was stable for 10 minutes. Ammonium chloride was added until the blue color was discharged and then a 10 g. excess of ammonium chloride was added. The ammonia was allowed to evaporate and the residue extracted with 200 ml. of chloroform. The chloroform extract was filtered and evaporated to a sirup. The sirup crystallized upon the addition of ether-petroleum ether. The crude crystalline material was recrystallized from an ether-petroleum ether mixture and gave 3.3 g. (95% yield) of pure crystalline, 1,2-O-isopropylidene-5-deoxy-5-mercapto-α-D-xylofuranose, M.P. 85° C., $[\alpha]_D^{25}$ —40.4° (c., 1.22 in methanol).

Analysis.—Calc'd for $C_{18}H_{14}O_4S$: C, 46.62; H, 6.79; S, 15.53. Found: C, 46.68; H, 6.98; S, 15.61.

The crystalline material was soluble in water, ethanol and methanol. It was insoluble in petroleum ether.

Titration with 0.1 N iodine solution showed the 98% of the thiol groups were free. An immediate color in the cold was given with both sodium nitro-prusside and 2,3,5-triphenyl-2H-tetrazalium chloride (Trevalyn, Procter and Hanison, Nature 166, 444 (1950)).

Step 3.—α-D-xylothiapyranose

The isopropylidene group was hydrolyzed to yield the free sugar, by dissolving 3.5 g. of 1,2-O-isopropylidene-5-deoxy-5-mercapto-α-D-xylofuranose in 100 ml. of 1 N sulfuric acid and allowing the solution to stand for 48 hours at 25° C. The solution was then heated with barium carbonate to remove the sulfuric acid and the so treated solution filtered. Concentration of the filtrate gave a sirup which crystallized, and 1.48 g. (52.2% yield) of crude crystalline α-D-xylothiapyranose was obtained. Recrystallization from an ethanol water mixture gave pure crystalline α-D-xylothiapyranose, M.P. 127°, $[\alpha]_D^{25}$ +198°→173° (c., 1.0 in water).

Step 4.—Methyl α-D-xylothiapyranoside

A solution of 2.3 g. of 1,2-O-isopropylidene-5-deoxy-5-mercapto-α-D-xylofuranose was refluxed in 100 ml. of 1% methanolic hydrogen chloride for 1 hour. At the end of this period, all thiol activity had disappeared. The solution was passed through a column of Dowex-1 (OH) to remove acids and the effluent evaporated to a sirup which crystallized. Recrystallization from either ethanol-ether mixture or ethyl acetate gave 1.1 g. (54.5% yield) of pure methyl α-D-xylothiapyranoside, M.P. 113°, $[\alpha]_D^{25}$ +332° (c., 1.0 in water).

Analysis.—Calc'd for $C_6H_{12}O_4S$: C, 40.00; H, 6.66; S, 17.77; $OCH_3$, 17.22. Found: C, 39.92; H, 6.49; S, 17.86; $OCH_3$, 17.49. Rast molecular weight: Found, 189; calc'd, 180.

Hydrolysis of methyl α-D-xylothiapyranoside with 1 N sulfuric acid solution at 80° C. caused a decrease in specific rotation, $[\alpha]_D^{25}$ +332° (c., 1.1 in $H_2O$), initial→+197° (45 minutes, equilibrium value).

EXAMPLE II.—PREPARATION OF METHYL β-D-RIBOTHIAFURANOSE FROM METHYL 2,3-O-ISOPROPYLIDENE-D-RIBOFURANOSIDE

Step 1.—Methyl 2,3-O-isopropylidene-5-O-tosyl-D-ribofuranose

Methyl 2,3-O-isopropylidine-D-ribofuranoside (80 g.) was unimolecularly tosylated, according to the procedure of Levene and Stiller (J. Biol. Chem. 106, 421 (1934)). Approximately 40 g. of crude material, M.P. 81° C., was obtained from the resulting sirup by the addition of ether. Upon recrystallization from cold ethanol, 16 g. (20% yield) of pure methyl 2,3-O-isopropylidene-5-O-tosyl-D-ribofuranose was obtained, M.P. 82–84°, $[\alpha]_D^{25}$ —35.5 (in ethanol).

Step 2.—*Methyl 2,3-O-isopropylidene-5-deoxy-5-thiobenzyl-D-ribofuranoside*

Ten grams of methyl 2,3-O-isopropylidene-5-O-tosyl-D-ribufuranoside and 12 g. of the sodium salt of benzyl mercaptan in 300 ml. of ethanol were refluxed for three hours. During the refluxing period there was a rapid precipitation of sodium toluenesulfonate. All of the reaction mixture was concentrated to dryness under vacuum and the solid residue extracted with 200 ml. of chloroform and water. The chloroform extract was washed with 1 N sulfuric acid and then with water. After drying with sodium sulfate, the chloroform solution was concentrated to a sirup which crystallized upon the addition of ether and petroleum ether. A yield of 7.8 g. (91% yield) of sirupy methyl 2,3-O-isopropylidene-5-deoxy-5-thiobenzyl-D-ribofuranoside was obtained.

Step 3.—*Methyl-2,3-O-isopropylidene-5-deoxy-5-mercapto-D-ribofuranoside*

Small pieces of sodium were added to a solution 7.8 g. of sirupy methyl 2,3-O-isopropylidene-5-deoxy-5-thiobenzyl-D-ribofuranoside in liquid ammonia until the blue color which developed was stable for 10 minutes. Ammonium chloride was then added until the blue color was discharged and then a 10 g. excess of ammonium chloride was added. The ammonia was allowed to evaporate and the residue extracted with 200 ml. of chloroform. The chloroform extract was filtered and evaporated to a sirup. The product as a sirup weighed 4.7 g. (85.5% yield), containing 80% of material with free thiol groups as estimated by iodine titration. This sirup was dissolved in 10 ml. each of methanol, acetic acid and water. The solution was titrated with iodine solution and a small amount of additional water added. A sirup separated which soon crystallized and 1.6 g. (35% yield) of crystalline material was filtered off. This crystalline material, which was the disulfide derivative of methyl 2,3 - O - isopropylidene - 5 - deoxy - 5 - mercapto - D-ribofuranoside, was washed with water and recrystallized from ethanol. The pure disulfide derivative had a melting point of 67° C. and a specific rotation, $[\alpha]_D^{25}$ —124° (c., 1.04 in methanol).

*Analysis.*—Calc'd for $C_{18}H_{30}O_8S_2$: C, 49.31; H, 6.84; S, 14.66. Found: C, 50.05; H, 6.67; S, 14.49.

Reduction of 0.5 g. of the disulfide derivative of methyl 2,3 - O-isopropylidene-5-deoxy-5-mercapto-D-ribofuranoside in 5 ml. of ether with lithium aluminum hydride (50 mg. in 2 ml. of ether) during 1 hr. at 25° C. caused complete reduction of the disulfide derivative. After destroying the excess reducing agent with water and hydrochloric acid, the ether layer was separated and concentrated. A yield of 0.5 g. of methyl 2,3-O-isopropylidene-5-deoxy-5-mercapto-D-ribofuranoside was obtained, which showed 93% free thiol groups by iodine titration.

Step 4.—*Methyl β-D-ribothiapyranoside*

A solution of 1 g. of methyl 2,3-O-isopropylidene-5-deoxy - 5 - mercapto - D-ribofuranoside in 50 ml. of 1% methanolic hydrogen chloride was refluxed for 5 hours. By the end of this period the thiol activity had been reduced to 10%. The solution was passed over a 20 g. column of Dowex–1 (OH) to remove the hydrogen chloride and the effluent was concentrated to a sirup. Ether (20 ml.) was added to the sirup and the mixture kept at 0° for 3 days. The sirup crystallized and upon filtration gave 0.1 g. (12.2% yield) crude product. The crude material was recrystallized from ethyl acetate to give pure, methyl β-D-ribothiapyranoside, M.P. 97°, $[\alpha]_D^{25}$ +18.6° (c., 0.59 in water).

*Analysis.*—Calc'd for $C_6H_{12}O_4S$: C, 40.00; H, 6.66; S, 17.77; $OCH_3$, 17.22. Found: C, 40.05; H, 6.46; S, 17.70; $OCH_3$, 17.11.

When hydrolyzed with 0.5 N hydrochloric acid solution at 75° C. the specific rotation of methyl β-D-ribothiapyranoside increased from +18.6 to +51.0 (constant after 0.5 hr.).

EXAMPLE III.—PREPARATION OF METHYL β-D-2-DEOXYRIBOTHIAFURANOSIDE FROM 2 - DEOXYRIBOSE

Step 1.—*Methyl 2-deoxy-D-ribofuranoside*

Following the procedure of Deviaz, Overend, Stacy and Wiggins (J. Chem. Soc. 1949, 2836), 10 g. of 2-deoxy-D-ribose was dissolved in 192 ml. of 0.1% methanolic hydrogen chloride and the resulting solution allowed to stand for 12 minutes at 25° C. The acid was then removed from the solution with Dowex–1 (OH) and the neutral effluent concentrated in vacuo to give 9.3 g. (84.5% yield) of sirupy, methyl 2-deoxy-D-ribofuranoside.

Step 2.—*Methyl 5-O-tosyl-2-deoxy-D-ribofuranoside*

A solution of 9.3 g. of sirupy methyl 2-deoxy-D-ribofuranoside in 100 ml. of pyridine was treated at 0–5° C. with a solution of 12 g. of tosyl chloride in 25 ml. of pyridine for 20 hours. The reaction mixture was worked up according to the procedure of Example 2, Step 1 to give 9.3 g. (49% yield) of methyl 5-O-tosyl-2-deoxy-D-ribofuranoside as a sirup.

Step 3.—*Methyl 5 - deoxy - 5-thiobenzyl-2-deoxy-D-ribofuranoside*

A solution of 9.3 g. of sirupy methyl 5-O-tosyl-2-deoxy-D-ribofuranoside and 12 g. of the sodium salt of benzyl mercaptan in 300 ml. of ethanol was refluxed for 3 hours. During the refluxing period there was a rapid precipitation of sodium toluenesulfonate. All of the reaction mixture was concentrated to dryness under vacuum and the solid residue extracted with 200 ml. of chloroform. The chloroform extract was washed with 1 N sulfuric acid and then with water. After drying with sodium sulfate, the chloroform solution was concentrated to a sirup. A yield of 7.7 g. (84% yield) of sirupy methyl 5-deoxy-5-thiobenzyl-2-deoxy-D-ribofuranoside was obtained.

Step 4.—*Methyl 5-deoxy-5-mercapto-2-deoxy-D-ribofuranoside*

Small pieces of sodium were added to a solution of 7.7 g. of methyl 5-deoxy-5-thiobenzyl-2-deoxy-D-ribofuranoside in liquid ammonia until the blue color which developed was stable for 10 minutes. Ammonium chloride was then added until the blue color was discharged and then a 10 g. excess of ammonium chloride was added. The ammonia was allowed to evaporate and the residue extracted with 200 ml. of chloroform. The chloroform extract was filtered and evaporated to a sirup. The product, methyl 5 - deoxy - 5 - mercapto-2-deoxy-D-ribofuranoside, as a sirup weighed 3.1 g. (62.8% yield), containing 95% material with free thio groups as estimated by iodine titration.

Step 5.—*Methyl β-D-2-deoxyribothiapyranoside*

A solution of 3.1 g. of the sirupy methyl 5-deoxy-5-mercapto-2-deoxy-D-ribofuranoside in 50 ml. of 1% methanolic hydrogen chloride was refluxed for 20 minutes, by the end of this period the thiol activity had been reduced to 5%. The solution was passed over Dowex–1 (OH) to remove the hydrogen chloride and the effluent concentrated to a sirup. A yield of 2.2 g. (73% yield) methyl β - D - 2 - deoxyribothiapyranoside was obtained, $[\alpha]_D^{25}$ —46.9° (c., 5.29 in methanol). When hydrolyzed at 75° C., with 0.25 N hydrochloric acid in 50% aqueous methanol, the specific rotation increased to —4.16° after 1.5 hours.

EXAMPLE IV.—PREPARATION OF METHYL D-GLUCOTHIAPYRANOSIDE FROM 5,6-DIDEOXY-5,6 - EPITHIO - 1,2 - O-ISOPROPYLIDENE-D-GLUCOFURANOSE

*Step 1.—3,6 - di - O-acetyl-1,2-O-isopropylidene-5-deoxy-5-thioacetyl-α-D-glucofuranose*

Acetolysis of 5,6 - dideoxy-5,6-epithio-1,2-O-isopropylidene-α-D-glucofuranose, which had been prepared by the method of Hall, Hough, and Pritchard, J. Chem. Soc. 1961, 1537, was effected using an acetolysis mixture of 25 ml. acetic anhydride, 5 ml. of acetic acid and 2.2 g. of potassium acetate. Thus, 1.63 g. of the 5,6-episulfide was mixed with 30 ml. of the acetolysis mixture and the resulting mixture heated for 4 hours at 130° C. At the end of this period, the reaction mixture was poured over 1000 ml. of crushed ice and stirred for 12 hours. The crystalline precipitate was separated and washed with water. After recrystallization from methanol-water, the crude product had a melting point of 145–146° C. After three additional recrystallizations from methanol-water, 50 mg. of pure 3,6 - di-O-acetyl-1,2-O-isopropylidene-5-deoxy-5-thioacetyl-α-D-glucofuranose was obtained, M.P. 149° C., $[\alpha]_D^{25}$ +7.2° (c., 1.8 in chloroform).

*Analysis.*—Calc'd for $C_{15}H_{22}O_8S$: C, 49.71; H. 6.12; S, 8.85. Found: C, 49.68; H. 5.90; S, 9.18.

This material had ultraviolet absorption at 230–240 m.μ characteristic for thiolacetate.

*Step 2.—Penta-O-acetyl-D-glucothiapyranose*

Four grams of 3,6-di-O-acetyl-1,2-O-isopropylidene-5-deoxy-5-thioacetyl-α-D-glucofuranose was dissolved in 30 ml. of acetolysis mixture (35 ml. acetic anhydride, 15 ml. acetic acid and 1 ml. sulfuric acid) and the resulting solution was allowed to stand for 72 hours at 25° C. The reaction mixture was poured into 150 ml. of crushed ice and stirred for 2 hours. The aqueous reaction mixture was neutralized with sodium bicarbonate and extracted with chloroform. The chloroform extract was washed with water, dried over sodium sulfate and concentrated to a sirup under vacuum. The sirup was treated with charcoal and methanol and filtered. The penta-O-acetyl-D-glucothiapyranose was obtained only as a chromatographically pure sirup, $[\alpha]_D^{25}$ +41.3° (c., 2.9 in chloroform).

*Analysis.*—Calc'd for $C_{16}H_{21}O_{10}S$: Acetyl, 52.91; S, 7.89. Found: Acetyl, 52.66; S, 8.04.

This material had no ultraviolet absorption in the region corresponding to thiol acetate, thereby confirming the presence of sulfur as the ring hetro atom.

*Step 3.—Methyl D-glucothiapyranoside*

Methanolysis of penta-O-acetyl-D-glucothiapyranose was effected with a methanolic hydrogen chloride. Thus, 0.152 gram of the pentaacetate was dissolved in 5 ml. of 4% methanolic hydrogen chloride and the resulting solution allowed to stand for approximately 30 hours at 37° C. At the end of this period the reaction mixture was through a column of Amberlite IR–45 resin to remove hydrogen chloride and the effluent was concentrated to a sirup under vacuum. The sirup was purified by paper chromatograph to give pure methyl D-glucothiapyranoside, $[\alpha]_D^{25}$ +208.0° (c., 0.9 in methanol).

*Analysis.*—Calc'd for $C_7H_{14}O_5S$; S, 15.26; $OCH_3$, 14.77. Found: S, 14.90; $OCH_3$, 14.77.

This material showed no thiol activity when titrated with iodine in acetic acid solution.

Methanolysis of 3,6-di-O-acetyl-1,2-O-isopropylidene-5-deoxy-5-thioacetyl-α-D-glucofuranoside with 5% methanolic hydrogen chloride at 37° C. for approximately 24 hours (followed polarimetrically to constant rotation) produced a sirupy, methyl D-glucothiapyranoside.

EXAMPLE V.—PREPARATION OF FRUCTOTHIAPYRANOSE FROM FRUCTOSE

*Step 1.—1,6-O-di-p-toluenesulfonyl-D-fructofuranose*

A solution of 252 g. of p-toluenesulfonyl chloride in 350 ml. of chloroform was added dropwise over a period of three hours to a solution of 200 g. of fructose in 800 ml. of pyridine at 0° C. The reaction mixture was warmed to room temperature and maintained at this temperature for approximately 18 hours. At the end of this period ice and water were added to the reaction mixture and the aqueous solution extracted with ether. The ether extract was washed with dilute hydrochloric acid, dilute sodium bicarbonate and then water. The washed ether extract was dried over sodium sulfate and concentrated under vacuum. A yield of 110 g. of sirupy, 1,6-O-di-p-toluenesulfonyl-D-fructofuranose was obtained.

*Step 2.—1,6-O-di-p-toluenesulfonyl-2,3-O-isopropylidene-D-fructofuranose*

The sirupy 1,6-O-di-p-toluenesulfonyl-D-fructofuranose (110 g.) was dissolved in 1200 ml. of acetone, and 100 g. of copper sulfate and 2.5 ml. of conc. sulfuric acid were added and the resulting mixture stirred for 48 hours at room temperature. At the end of this time, the reaction mixture was neutralized by stirring with powdered potassium carbonate. After filtering, the acetone solution was concentrated under vacuum to a sirup. Two volumes of methanol were added to the sirup and the resulting solution cooled to 0° C. The resulting crystalline mass was filtered and the crystals washed with cold methanol. The purified 1,6-O-di-p-toluenesulfonyl-2,3-O-isopropylidene-D-fructofuranose had a melting point of 130° C.

*Step 3.—1-O-p-toluenesulfonyl-2,3-O-isopropylidene-6-deoxy-6-thiobenzyl-D-fructofuranose*

Ten grams of crystalline 1,6-O-di-p-toluenesulfonyl-2,3-O-isopropylidene-D-fructofuranose was dissolved in 150 ml. of ethanol and 8.8 grams of sodium benzyl mercaptide was added. This solution was refluxed for one hour, then cooled, filtered and concentrated to a sirup. The sirup was taken up in chloroform, filtered and concentrated. Addition of a small amount of methanol to the concentrated chloroform solution produced a crystalline material. Three recrystallizations of this material from methanol gave a pure crystalline 1-O-p-toluenesulfonyl-2,3-O-isopropylidene-6-deoxy-6-thiobenzyl-D-fructofuranose, M.P. 120° C.

*Analysis.*—Calc'd: C, 57.47; H, 5.87; S, 13.34. Found: C, 57.55; H, 5.68; S, 13.20.

*Step 4.—2,3-O-isopropylidene-6-deoxy-6-thiobenzyl-D-fructofuranose*

1-O-p-toluenesulfonyl-2,3-O-isopropylidene - 6 - deoxy-6-thiobenzyl-D-fructofuranose (2.31 grams) was dissolved in 20 ml. of tetrahydrofuran and 1.4 grams of lithium aluminum hydride was added. This mixture was allowed to reflux for approximately 96 hours. The reaction mixture was cooled, filtered and concentrated to a sirup. This sirup was dissolved in chloroform and dried over anhydrous magnesium sulfate. The solution was again concentrated to a sirup and after drying in a desiccator over calcium chloride for approximately three hours gave a crystalline material. Recrystallization of this from ethyl acetate gave pure crystalline, 2,3-isopropylidene-6-deoxy-6-thiobenzyl-D-fructofuranose, M.P. 93° C.

*Analysis.*—Calc'd for $C_{16}H_{22}O_5S$: C, 58.87; H, 6.79; S, 9.82. Found: C, 59.18; H, 6.49; S, 9.86.

*Step 5.—2,3-O-isopropylidene-6-deoxy-6-mercapto-D-fructofuranose*

Small pieces of sodium were added to a solution of 2,3 - O - isopropylidene - 6 - deoxy - 6 - thiobenzyl - D-fructofuranose in liquid ammonia until the blue color which developed was stable for approximately 10 minutes. This was conducted under an atmosphere of nitrogen. Ammonium chloride was then added until the blue color was discharged and then a 10 gram excess of ammonium chloride was added. The ammonia was allowed to evaporate and the residue extracted with 200 ml. of chloroform. The chloroform extract was filtered and evaporated to a sirup. The product, 2,3-O-isopropyliene - 6 - deoxy - 6 - mercapto - D - fructofuranose, was obtained as a sirup.

Step 6.—*Methyl D-fructothiapyranoside*

A solution of the above sirupy, 2,3-D-isopropylidene-6-deoxy-6-mercapto-D-fructofuranose when refluxed for approximately 30 minutes with 1% methanolic hydrogen chloride, will yield as the product, methyl-D-fructothiapyranoside.

EXAMPLE VI

Following the general procedure of Example IV, the corresponding 5,6-dideoxy-5,6-epithio derivatives of D-mannofuranose, D-galactofuranose and L-idofuranose are substituted for the 5,6-dideoxy-5,6-epithio derivative of glucofuranose. Similar yields of D-mannothiapyranose, D-galatothiopyranose and L-idothiapyranose will be obtained.

EXAMPLE VII

Following the general procedure of Example 1, when arabifuranose is substituted for xylofuranose a good yield of arabithiapyranose will be obtained.

EXAMPLE VIII.—PREPARATION OF D-XYLOTHIAFURANOSE FROM l-ARABINOSE

Step 1.—*5-Tosyl-l-arabinose dimethyl acetal*

One gram (.005 mole) of l-arabinose dimethyl acetal, which had been prepared according to the method of Wolfram, Konigsberg, and Moody, J. Am. Chem. Soc. 62, 2343 (1940), was dissolved in 10 ml. of dry pyridine and a solution of 1.1 grams (.0056 mole) of p-toluenesulfonyl chloride in 10 ml. of dry pyridine was added. The resulting reaction mixture was allowed to stand overnight and then decomposed by pouring into 100 ml. of ice water. The organic phase was extracted with methylene chloride. The methylene chloride extract was washed with water, dilute sulfuric acid, dilute sodium bicarbonate and finally water. After drying over anhydrous sodium sulfate, the methylene chloride was evaporated, and 1 gram of sirupy 5-tosyl-l-arabinose dimethyl acetal was obtained.

Step 2.—*5-thioacetyl-l-arabinose dimethyl acetal*

Following the general procedure of Chapman and Owen, J. Chem. Soc. 1950, 579, an equimolar mixture of 5-tosyl-l-arabinoes dimethyl acetal and potassium thiolacetate dissolved in acetone was refluxed for approximately three hours until the theoretical amount of potassium tosylate had precipitated. The precipitate was removed by filtration and the liquid evaporated to yield a sirupy, 5-thioacetyl-l-arabinose dimethyl acetal.

Step 3.—*2,3,4-tri-O-acetyl-5-thioacetyl-l-arabinose dimethyl acetal*

The above sirupy, 5-thioacetyl-l-arabinose dimethyl acetal was treated overnight with an excess of an acetylating mixture of 50% acetic anhydride and 50% pyridine. The resulting mixture was decomposed by pouring into ice water and stirring for one hour. The organic phase was extracted with methlene chloride, and the extract was washed with water, dilute sulfuric acid, dilute sodium bicarbonate solution and then water. After drying over anhydrous sodium sulfate the solvent was evaporated and the 2,3,4 - tri - O - acetyl - 5 - thioacetyl - 1 - arabinose dimethyl acetal was obtained as a sirup.

Step 4.—*4,5-epithio-2,3-di-O-acetyl-d-xylose dimethyl acetal*

Following the general procedure of Miles and Owen, J. Chem. Soc. 1952, 817 and Goodman, Benitey and Baker, J. Am. Chem. Soc. 80, 168 (1958), the above 5-thioacetyl compound was converted to 4,5-epithio compound. Thus, the 2,3,4-tri-O-acetyl-5-thioacetyl-l-arabinose dimethyl acetal was dissolved in a mixture of ethanol and water and the pH adjusted to approximately 8 to 9 with dilute sodium hydroxide. After two hours at room temperature, the solution was neutralized by adding Dry Ice. The mixture was extracted with methene chloride and the extract washed with water. After drying over anhydrous sodium sulfate, the solvent was evaporated to give the 4,5-epithio-2,3-di-O-acetyl-d-xylose dimethyl acetal as a sirup. The infrared spectrum of this material showed a peak at 3050 cm.$^{-1}$ due to episulfide and no thioacetate peak.

Step 5.—*2,3,5-tri-O-acetyl-4-deoxy-4-thioacetyl-d-xylose dimethyl acetal*

The sirupy 4,5-epithio-2,3-di-O-acetyl-d-xylose dimethyl acetal was mixed with an acetolysis mixture of 25 ml. of acetic anhydride, 5 ml. of acetic acid and 2.2 grams of potassium acetate and the resulting mixture heated for 4 hours at 130° C. At the end of this period, the reaction mixture was decomposed by pouring over ice and stirring the resulting mixture. The mixture was extracted with methylene chloride and the extract washed with water. After drying over anhydrous sodium sulfate, the solvent was evaporated to give a sirupy, 2,3,5-tri-O-acetyl-4-deoxy-4-thioacetyl-d-xylose dimethyl acetal.

Step 6.—*Tetra-O-acetyl-d-xylothiafuranose*

The above, 2,3,5 - tri - O - acetyl - 4 - deoxy - 4 - thioacetyl-d-xylose dimethyl acetal when treated with an acetolysis mixture of acetic anhydride, acetic acid and sulfuric acid in a manner similar to that given in Example IV, will yield the tetra-O-acetyl-d-xylothiafuranose.

Step 7.—*d-Xylothiafuranose*

Treatment of the above tetra-O-acetyl-d-xylothiafuranose with methanolic hydrochloride will yield methyl-d-xylofuranoside. Acid hydrolysis with dilute hydrochloric acid of the tetraacetate of the furanoside will yield d-xylofuranose.

EXAMPLE IX

When l-arabinose is replaced in the process of Example VIII with d-xylose, 1-lyxose, d-ribose, 2-deoxy-d-ribose or 2-deoxyl-l-lyxose, their corresponding thiafuranose derivative, l-arabinothiafuranose, d-idothiafuranose, l-lxothiafuranose, 2-deoxy-l-lyxothiafuranose and 2-deoxy-l-ribothiafuranose, will be obtained.

EXAMPLE X.—XYLTHIAPYRANOSE SULFOXIDE

Xylothiapyranose, 1 g., was dissolved in 50 ml. water. Bromine was added dropwise with stirring and dissolved quickly giving a colorless solution. The addition of bromine was continued until the solution took a permanent yellow color of excess bromine.

The acidic solution was immediately neutralized with Dowex–1–X8, HCO$_3^-$ cycle. Evaporation gave a sirup which partially crystallized. The crystals thus formed have a rotation of about —5° in water and may be recrystalized with some difficulty from methanol to M.P. 169–172° C.

Paper chromatography using 1-butanol, pyridine, water 10/3/3 v./v./v. gave two main spots. Spot No. 1, R$_f$ 0.676, was the above mentioned isomer [α]$_D^{20}$ —5° in H$_2$O. Spot No. 2, R$_f$ 0.606, had a rotation of +124° in water and when isolated by paper chromatography gave sirupy crystals, M.P. 60–80° C.

*Analysis*—Calc'd for C$_5$H$_{10}$O$_5$S: C, 33.0; H, 5.5; S, 17.57. Found: C, 33.5; H, 4.8; S. 17.7.

EXAMPLE XI

When xylothiapyranose is replaced in the process of Example X with ribothiapyranose, 2-deoxy-ribothiapyranose, or glucothiapyranose, their corresponding sulfoxides, ribothiapyranose sulfoxide, 2-deoxyribothiapyranose sulfoxide and glycothiapyranose sulfoxide will be obtained.

EXAMPLE XII

Replacement of xylothiapyranose in the process of Example X with xylothiafuranose, arabinothiafuranose, lyxothiafuranose or 2-deoxyribothiafuranose will result in the formation of their corresponding sulfoxides, xylothiafuranose sulfoxide, ribothiafuranose sulfoxide, lyxothiafuranose sulfoxide, and 2-deoxyribothiafuranose sulfoxide.

EXAMPLE XIII.—XYLOTHIAPYRANOSE SULFONE

Xylothiapyranose, 2.0 g., was dissolved in 20 ml. glacial acetic acid and 6 ml. 30% hydrogen peroxide was added. The reaction temperature rose to 50° C. When the reaction had cooled it was warmed on a hot plate to about 45–50°. At this point the temperature spontaneously rose to 103°. After cooling, the acetic acid was removed by evaporation on a vacuum flash evaporator. Water was added and the remaining acid removed with Dowex 1-X8, $HCO_3^-$ cycle. The water was evaporated and then azeotroped with ethanol. A yield of 0.3 g. of crystals resulted, M.P. 129–131°. After recrystallization from ethanol-ethyl acetate, the product had a M.P. of 134–137°, $[\alpha]_D^{20}$ +25.8 (c., 2.1 in water).

Analysis—Calc'd. for $C_5H_{10}O_6S$: S, 16.15. Found: S, 16.2.

EXAMPLE XIV

Substitution of xylothiapyranose with other thiasugars, as 2-deoxylyxothiafuranose, arabinothiafuranose, idothiafuranose, glucothiapyranose, ribothiapyranose, fructothiapyranose and 2-deoxyribothiapyranose will yield their corresponding sulfones, 2-deoxylyxothiafuranose sulfone, arabinothiafuranose sulfone, idothiafuranose sulfone, glucothiapyranose sulfone, ribothiapyranose sulfone, fructothiapyranose sulfone, and 2-deoxyribothiapyranose sulfone.

EXAMPLE XV.—N-PHENYL-D-THIAXYLOSYLAMINE

D-xylothiapyranose (D-thiaxylopyranose) (0.55 g. .0033 mole), 0.55 gram (.0059 mole) of aniline, 0.6 ml. of ethanol, 0.1 ml. of water and .01 ml. of glacial acetic acid were mixed and refluxed on a steam bath for approximately two hours. Crystalline material began to separate after approximately 30 minutes. After refluxing the reaction mixture was cooled, filtered, and the material on the filter was washed with a small amount of alcohol, followed by ether. A yield of 0.55 gram (69% yield) of crude (M.P. 197–8° C.) N-phenyl-D-thiaxylosylamine was obtained. Recrystallization from methanol gave colorless plates, M.P. 198° C.

EXAMPLE XVI

The use of other thiasugars, such as 2-deoxylyxothiafuranose, arabinothiafuranose, idothiafuranose, glucothiapyranose, ribothiapyranose fructothiapyranose and 2-deoxyribothiapyranose in the presence of Example XV, as well as the use of other amines, such as, butylamine, hexylamine, α-phenylethylamine, dibutyl amine, α-phenylethylamine, dibutyl amine, naphthylamine, tolyamine, diethyl amine, octyl amine, β-phenylethyl amine, and diphenyl amine; will give the corresponding N-glycosides of the thiasugars.

In the synthesis method as illustrated above for the preparation of the thiapyranoses, such as 2-deoxy-D-ribothiapyranoside, fructothiapyranose, and D-xylothiapyranose, the essential steps comprising this preparative method are (1) the formation of a sulfonic acid ester of the primary hydroxyl group of the hydroxymethyl group on carbon atom 4 of the furanose ring; (2) the nucleophilic displacement of the sufonic acid group by a sulfur containing nucleophile; (3) the displacement or reduction of thio compound to give the corresponding mercapto compounds; and (4) acid rearrangement and hydrolysis or alcoholysis of the mercapto compound to yield the thiapyranose or the thiapyranoside.

In the first step of the above synthesis method, the preparation of the sulfonic acid ester of the primary hydroxyl group of the hydroxymethyl group, a variety of sulfonic acid esters may be formed such as the various toluenesulfonic acid esters, benzenesulfonic acid esters, or methanesulfonic acid esters. These esters are most conveniently prepared using the corresponding sulfonyl chloride as the esterifying agent. This subject has been reviewed by Tipton, Advances in Carbohydrate Chemistry 8, 107–217 (1953), and various other esterifying agents and conditions may be found there.

It is, of course, to be understood that in the majority of cases, blocking off of certain reactive hydroxyl groups is necessary. This blocking off may be accomplished most conveniently by the formation of a cyclic acetal, such as the isopropylidene acetal and/or in the case of a reactive hydroxyl group on carbon atom 1, the formation of an ether or furanoside. The blocking by means of the isopropylidene acetal is illustrated above, for example in the preparation of xylothiapyranose, while the formation of the furanoside is illustrated in the preparation of 2-deoxyribothiapyranose. The combination of both is shown in the preparation of ribothiapyranose. The formation of cyclic acetals, such as the various O-arylidene and O-alkylidene acetals, from various ketones and aldehydes, such as acetone, benzaldehyde and formaldehyde is, of course, a rather well known reaction in carbohydrate chemistry. The subject has been discussed and numerous references cited, in The Carbohydrates, W. Pigman, ed., page 229–240 [Academic Press (1957)]. The formation of a furanoside is, of course, a well known reaction of carbohydrate chemistry and, in essence, involves the reaction of the furanose and the alcohol in an acidic environment.

The second step which is the desulfonyloxylation of the 5-O-sulfonyl furanose compounds by a sulfur-containing desulfonyloxylation agent, including the nucleophilic displacement of the sulfonic acid group by a sulfur-containing nucleophile wherein the negative charge resides in the sulfur atom, may be effected by a variety of methods. The essential feature of this step resides in the formation of a C–S bond between carbon atom 5 of the furanose compound and the sulfur containing nucleophile. Suitable sulfur containing nucleophiles or desulfonyloxylation agents, include those derived from alkyl mercaptans having from 4 to 20 carbon atoms, such as butyl-, octyl- and hexadecyl-mercaptan, and from aralkyl mercaptans, such as benzyl-, 2-tolylethyl-, and 4-phenylbutyl-mercaptan. Other suitable sulfur-containing nucleophiles include inorganic materials such as sulfide ($S^-$), bisulfide ($HS^-$), thiocyanate ($SCN^-$) and thiosulfate ($S_2O_3^=$) as well as others of an organic nature, such as thiolcarboxylate, i.e. thiolaceate ($CH_3COS^-$), thiolbutyrate ($CH_3CH_2CH_2COS^-$) and thiolpropionate ($CH_3CH_2COS^-$). This step is most conveniently effected by heating the sulfonic acid ester of the furanose with an alkali metal salt of the sulfur compound. The preferred alkali metal salts are the sodium and potassium salts, although other alkali metal salts, such as the lithium, rubidium and cesium salts may be used. Also, alkaline earth salts, such as calcium and barium may be used. Although this step may in some cases be effected by heating the reactants alone, such as in the case of heating a eutectic melt of potassium thiocyanate and the sulfonic acid ester, it is preferred to effect this step in solution at approximately the reflux temperature of the solution. A variety of solvents may be used. Thus, for example, alcohols, such as ethanol and butanol; ketones, such as acetone and methyl ethyl ketone; N-substituted amides, such as dimethylforamide; and water are utilizable. Water is principally used in admixture with the organic solvents, although it may be used as the sole solvent with inorganic materials such as sodium sulfide.

The third step involves the reduction of the thio compound to the mercapto compound. Thus, while the essential feature of the second step was the formation of the C–S bond at carbon atom 5 of the furanose compound, the essential feature of this step resides in the formation of the C–S–H configuration at carbon atom 5. Except in the case where the sulfide or bisulfide is used in the second step, the sulfur has other groups associated with it which must be removed to give the mercapto compound. Also, with the use of sulfide or bisulfide in the second step considerable quantities of the disulfide are formed, and reduction of this material improves the yield of mercapto compound.

This third step may be effected using a variety of reducing agents, for example the alkali metal hydrides, such as lithium aluminum hydride, potassium borohydride and sodium hydride, alkali metals in liquid ammonia, such as a sodium in liquid ammonia, and alkali metals in methanol, such as sodium in methanol. The use of sodium in liquid ammonia to reduce the benzyl mercapto group has been illustrated in the above examples, other illustrative cases includes, the use of lithium aluminum hydride to reduce the disulfide, also shown above, deacylation of the 5-thiocarboxylate with sodium methoxide in methanol, and reduction of the thiosulfate compound with potassium borohydride. In each case, the experimental procedures used are those conventionally used in the art to effect such reductions.

The fourth step involves the acid rearrangement and hydrolysis or alcoholysis of the mercapto compound to cleave the oxide furanose ring and form the thiapyranose ring. This acidic treatment is conveniently effected in a liquid acidic media using a dilute solution of hydrochloric acid, but other acids such as sulfuric, phosphoric and acetic acid are useful. Another convenient method to effect the acidic treatment is to contact an aqueous solution of the mercapto compound with a mildly acidic ion exchange resin, such as Amberlite IR–120. In general, acid concentrations of from approximately 2% to about 10% by weight of the acid in the water or alcohol solvent may be used, preferably concentrations of about 5% are used.

Neutralization of the acidic solution of the thiapyranose may be effected by the use of basic ion exchange resins, such as Dowex 1 (OH), and Amberlite IR–45 or by neutralization with a dilute base, such as sodium hydroxide and sodium bicarbonate. A description of other suitable ion exchange resins, as well as a more precise definition of those used herein may be found in Kirk and Othmer, Encyclopedia of Chemical Technology, volume 8, pages 1–18, Interscience Encyclopedia, Inc., New York (1952).

When a thiapyranoside is desired as the final product, the formation of the thiapyranose ring is accomplished in a slightly acidic alcoholic solution of the mercapto furanose compound. Hydrochloric acid is the most convenient acid to use for this step, although other acids as given may be used. A wide variety of alcohols may be used, such as ethyl, butyl, hexyl, benzyl, phenyl, tolyl and 2-phenylethyl.

The second general synthetic method for the preparation of the thiapyranoses involves the steps of (1) cleaving the 5,6-dideoxy-5,6-episulfide furanose with an acetolysis mixture, such as a solution comprising acetic anhydride, acetic acid and excess acetate ion, and (2) acid hydrolysis or alcoholysis or acetolysis of the 5-thioacetyl furanose to the thiapyranose.

The formation of the 5,6-dideoxy-5,6,-episulfide-furanose compounds may be accomplished by two general methods. The first of these methods is based upon the treatment of a chloroform solution of the 6-thiolacetate-5-O-acetate furanose with methanolic sodium methoxide at approximately 0° C.; this is a generalized method for the preparation of a sugar epithia compounds, as exemplified and discussed by Creighton and Owen, J. Chem. Soc. 1960, 1024–29, and the references cited therein. The other general method is based on the reaction of a 5,6-epoxy sugar with thiourea in methanol. This effects a substitution of the epoxy oxygen by a sulfur, and this is more fully exemplified and discussed by Hall, Hugh and Pritchard, J. Chem. Soc. 1961, 1537–45. As has been discussed above, in some cases blocking of reactive hydroxy groups by the formation of cyclic acetal, and/or ethers or esters must be effected.

The cleaving of the episulfide is most conveniently effected using a mixture of acetic anhydride, acetic acid and potassium acetate. Although cleavage of the episulfide is also accomplished using other reagents such as a mixture of propionic anhydride, propionic acid and excess propionate ion, the above is preferred.

The second step involves the acid hydrolysis or alcoholysis of the 5-thioacetyl furanose to the thiapyranose compound; these hydrolysis steps may be effected as discussed above. Additionally, this step may be effected using an acetolysis mixture, such as acetic anhydride, acetic acid and sulfuric acid. When acetolysis is used to effect this step the pentacetyl derivative is obtained.

The preparation of the thiafuranose compound is conveniently effected in a manner similar to one of the methods used to effect the preparation of the thiapyranoses. Thus, this method involves the steps of (1) cleaving a 4,5-dideoxy-4,5-episulfide compound with an acetolysis mixture to give a 4-thioacetyl compound; and (2) acid rearrangement and hydrolysis of the 4-thioacetyl compound of the thiafuranose.

The preparation of the 4,5-dideoxy-4,5-episulfide sugars is suitably accomplished by either of the two general methods which have been discussed above for the preparation of the 5,6-dideoxy-5,6-episulfide furanose compounds. Thus, the 4,5-dideoxy-4,5-episulfide sugars may be prepared by treatment of the 5-thiolacetate-4-O-acetate sugar with methanolic sodium methoxide, or they may be prepared from the 4,5-epoxy sugar and thiourea.

The reaction conditions necessary to effect the episulfide cleavage and acid hydrolysis and rearrangement are similar to those discussed above.

The preparation of glycosides and thioglycosides of the thiasugars of the present invention is conveniently effected by the reaction of a thiasugar with the corresponding alcohol or mercaptan in the presence of a mineral acid, such as hydrochloric, sulfuric or phosphoric. Suitable alcohols and mercaptans, include hexyl, benzyl, ethyl, phenyl, tolyl, 2-ethylhexyl, 2-phenylethyl and α-naphthyl. In essence, the preparation involves refluxing a solution comprising the thiasugar and the alcohol or mercaptan in the presence of from about 2% to about 10% mineral acid.

The sulfoxide and the sulfone forms of the thiapyranoses and thiafuranoses within the scope of the present invention result when these compounds are treated with a mild oxidizing agent. The existence of such forms is somewhat surprising and tends to indicate the stability of the sulfur substituted ring. There is, of course, no analogous series of compounds in the normal series of pyranose and furanose sugars. The oxidation of the hetero sulfur atom may be effected using mild oxidizing agents, such as acidic solutions of hydrogen peroxide or dilute solutions of hypohalogenous acids, Thus, mild oxidizing agents, such as hydrogen peroxide in acetic acid, bromine water and chlorine water may be used to effect this oxidation. Oxidation to the sulfone form is accomplished using an excess of the oxidizing agent.

The compounds within the scope of the present invention are of both chemical and biochemical interest as sugar analogs. The compounds are particularly useful in the preparation of resins by reaction with a diisocyanate or other polyisocyanates, suitable processes for the preparation of such resins are disclosed in U.S. Patents 2,989,512 (Nischk et al.), 2,962,455 (Hostettler et al.) and 3,022,256 (Barnes) and French Patent 1,278,18. These resins show improved rigidity and anti-oxidant properties as compared to the conventional resins. The compounds of the present invention are also useful as radiation absorbers and as chain terminators in free radical polymerizations.

I claim:
1. A thiasugar of the formula

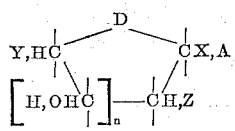

wherein $n$ is an integer having a value of from 1 to 2; D is a member selected from the group consisting of thia (—S—), sulfoxide

and sulfone

A is a member selected from the group consisting of —OH, —OR, —SR, —NHR and —NR$_2$, wherein R is a member selected from the group consisting of alkyl, aralkyl and aryl; X is a member selected from the group consisting of hydrogen and hydroxymethyl (—CH$_2$OH); Z is a member selected from the group consisting of hydrogen and hydroxyl; and Y is a member selected from the group consisting of hydrogen and hydroxymethyl (—CH$_2$OH) when $n$ is equal to 2 and Y is hydroxymethyl (—CH$_2$OH) when $n$ is equal to 1.

2. A thiapyranose of the formula

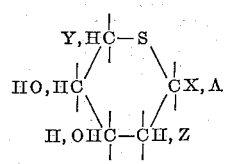

wherein A is a member selected from the group consisting of —OH, —OR, —SR, —NHR and —NR$_2$, wherein R is a member selected from the group consisting of hydrogen, alkyl, aralkyl, and aryl; X is a member selected from the group consisting of hydrogen and hydroxymethyl (—CH$_2$OH); Y is a member selected from the group consisting of hydrogen and hydroxymethyl (—CH$_2$OH); and Z is a member selected from the group consisting of hydrogen and hydroxyl.

3. α,D-xylothiapyranose.
4. Methyl β-D-ribothiapyranoside.
5. Methyl β-2-deoxy-D-ribothiapyranoside.
6. Methyl D-glucothiapyranoside.
7. A process for the preparation of a thiapyranose of the formula

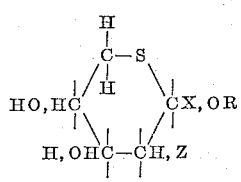

wherein R is a member selected from the group consisting of hydrogen, alkyl, aralkyl and aryl; X is a member selected from the group consisting of hydrogen and hydroxymethyl (—CH$_2$OH); and Z is a member selected from the group consisting of hydrogen and hydroxyl, from the 5-O-sulfonylfuranose compound corresponding thereto which comprises the steps of (1) mixing said 5-O-sulfonylfuranose compound with a sulfur containing desulfonyl-oxylation agent to form a 5-deoxy-5-thiofuranose, (2) recovering the 5-deoxy-5-thiofuranose compound so formed, (3) mixing said 5-deoxy-5-thiofuranose compound with a reducing agent to reduce said 5-deoxy-5-thiofuranose compound to the 5-deoxy-5-mercaptofuranose, (4) recovering the 5-deoxy-5-mercaptofuranose compound so formed, (5) introducing said 5-deoxy-5-mercaptofuranose compound into a liquid acidic media to hydrolyze said 5-deoxy-5-mercaptofuranose to a thiapyranose, and (6) recovering the thiapyranose so formed.

8. A process for the preparation of a thiapyranose of the formula

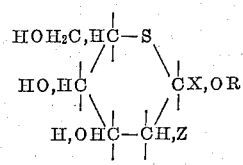

wherein R is a member selected from the group consisting of hydrogen, alkyl and aryl; X is a member selected from the group consisting of hydrogen and hydroxymethyl (—CH$_2$OH); Z is a member selected from the group consisting of hydrogen and hydroxyl, from the 5,6-dideoxy-5,6-episulfide furanose corresponding thereto, which comprises the steps of (1) mixing the 5,6-dideoxy-5,6-episulfide furanose with an acetolysis mixture to form the 5-thioacetyl furanose, (2) recovering the 5-thioacetyl furanose, (3) introducing said 5-thioacetyl furanose compound into a liquid acidic media to hydrolyze said 5-thioacetyl furanose to a thiapyranose, and (4) recovering the thiapyranose.

9. A thiafuranose, of the formula

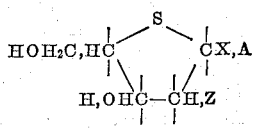

wherein A is a member selected from the group consisting of —OH, —OR, —SR, —NHR and —NR$_2$, wherein R is a member selected from the group consisting of alkyl, aralkyl and aryl; X is a member selected from the group consisting of hydrogen and hydroxymethyl (—CH$_2$OH); and Z is a member selected from the group consisting of hydrogen and hydroxyl.

10. D-xylothiafuranose.
11. 2-deoxy-1-lyxothiafuranose.
12. l-Arabinothiafuranose.
13. A process for the preparation of a thiafuranose of the formula

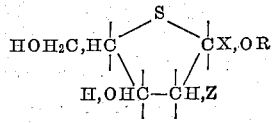

wherein R is a member selected from the group consisting of hydrogen, alkyl, aralkyl, and aryl; X is a member selected from the group consisting of hydrogen and hydroxymethyl (—CH$_2$OH); and Z is a member selected from the group consisting of hydrogen and hydroxyl, from the 4,5-dideoxy-4,5-episulfide compound corresponding thereto which comprises the steps of (1) mixing said 4,5-dideoxy-4,5-episulfide compound with an acetolysis mixture to form the 4-thioacetyl compound;

(2) recovering the 4-thioacetyl compound;

(3) introducing said 4-thioacetyl compound into a liquid acidic media to hydrolyze said 4-thioacetyl compound to a thiafuranose; and (4) recovering the thiafuranose.

14. A sulfoxide of the formula

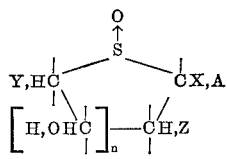

wherein $n$ is an integer having a value of from 1 to 2; A is a member selected from the group consisting of —OH, —OR, —SR, —NHR and —NR$_2$, wherein R is a member selected from the group consisting of alkyl, aralkyl, and aryl; X is a member selected from the group consisting of hydrogen and hydroxymethyl (—CH$_2$OH); Z is a member selected from the group consisting of hydrogen and hydroxyl; and Y is a member selected from the group consisting of hydrogen and hydroxymethyl (—CH$_2$OH) when $n$ is equal to 2 and Y is a hydroxymethyl (—CH$_2$OH) when $n$ is equal to 1.

15. A sulfone of the formula

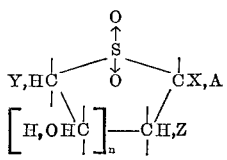

wherein $n$ is an integer having a value of from 1 to 2; A is a member selected from the group consisting of —OH, —OR, —SR, —NHR, and —NR$_2$, wherein R is a member selected from the group consisting of alkyl, aralkyl and aryl; X is a member selected from the group consisting of hydrogen and hydroxymethyl (—CH$_2$OH); Z is a member selected from the group consisting of hydrogen and hydroxyl; and Y is a member selected from the group consisting of hydrogen and hydroxymethyl (—CH$_2$OH) when $n$ is equal to 2 and Y is a hydroxymethyl (—CH$_2$OH) when $n$ is equal to 1.

16. A process for the preparation of a sulfoxide of the formula

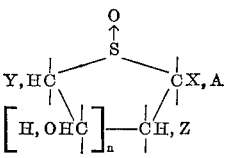

wherein $n$ is an integer having a value of from 1 to 2; A is a member selected from the group consisting of —OH, —OR, —SR, —NHR, and —NR$_2$, wherein R is a member selected from the group consisting of alkyl, aralkyl, and aryl; X is a member selected from the group consisting of hydrogen and hydroxymethyl (—CH$_2$OH); Z is a member selected from the group consisting of hydrogen and hydroxyl; and Y is a member selected from the group consisting of hydrogen and hydroxymethyl (—CH$_2$OH) when $n$ is equal to 2 and Y is a hydroxymethyl (—CH$_2$OH) when $n$ is equal to 1, which comprises the steps of mixing a compound selected from the group consisting of a thiapyranose and a thiafuranose with a mild oxidizing agent to oxidize said compound to the corresponding sulfoxide, and recovering the sulfoxide so formed.

17. Xylothiapyranose sulfoxide.
18. Xylothiafuranose sulfoxide.
19. A process for the preparation of a sulfone of the formula

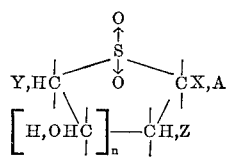

wherein $n$ is an integer having a value of from 1 to 2; A is a member selected from the group consisting of —OH, —OR, —SR, —NHR, and —NR$_2$, wherein R is a member selected from the group consisting of alkyl, aralkyl and aryl; X is a member selected from the group consisting of hydrogen and hydroxymethyl (—CH$_2$OH); Z is a member selected from the group consisting of hydrogen and hydroxyl; and Y is a member selected from the group consisting of hydrogen and hydroxymethyl (—CH$_2$OH)

when $n$ is equal to 2 and Y is a hydroxymethyl (—CH$_2$OH)

when $n$ is equal to 1, which comprises the steps of mixing a compound selected from the group consisting of a thiapyranose and a thiafuranose with an excess of a mild oxidizing agent to oxidize said compound to the corresponding sulfone and recovering the sulfone so formed.

20. Xylothiapyranose sulfone.
21. 2-Deoxylyxothiafuranose sulfone.

References Cited by the Examiner

Prelog et al.: Chemical Abstracts, vol. 33 (1939), page 4250.

Chemistry and Industry, 1962 (41), pages 1795–6, Clayton et al.

Ingles et al: Jour. of Org. Chem., vol. 27 (November 1962), pages 3896–8.

LEWIS GOTTS, *Primary Examiner.*

NICHOLAS S. RIZZO, J. PATTEN, P. A. STITH,
*Assistant Examiners.*